(12) United States Patent
Cort

(10) Patent No.: US 7,625,490 B2
(45) Date of Patent: Dec. 1, 2009

(54) USE OF A MAGNETIC SEPARATOR TO BIOLOGICALLY CLEAN WATER

(76) Inventor: Steven L. Cort, 411 Bathgate La., Cary, NC (US) 27513

( * ) Notice: Subject to any disclaimer, the term of this patent is extended or adjusted under 35 U.S.C. 154(b) by 0 days.

(21) Appl. No.: 11/862,623

(22) Filed: Sep. 27, 2007

(65) Prior Publication Data
US 2008/0073268 A1 Mar. 27, 2008

Related U.S. Application Data

(60) Provisional application No. 60/847,384, filed on Sep. 27, 2006.

(51) Int. Cl.
*C02F 3/30* (2006.01)
*C02F 1/48* (2006.01)
*C02F 1/56* (2006.01)

(52) U.S. Cl. .............. 210/618; 210/624; 210/626; 210/630; 210/631; 210/695; 210/713; 210/714; 210/903

(58) Field of Classification Search .............. 210/618
See application file for complete search history.

(56) References Cited

U.S. PATENT DOCUMENTS

| | | | | |
|---|---|---|---|---|
| 3,697,420 A | * | 10/1972 | Blaisdell et al. | 210/695 |
| 4,502,958 A | * | 3/1985 | Sasaki | 210/695 |
| 4,735,725 A | * | 4/1988 | Reischl et al. | 210/616 |
| 4,951,593 A | * | 8/1990 | Brown et al. | 114/297 |
| 5,290,451 A | * | 3/1994 | Koster et al. | 210/605 |
| 5,514,278 A | * | 5/1996 | Khudenko | 210/605 |
| 5,976,378 A | * | 11/1999 | Sumino et al. | 210/616 |
| 6,071,407 A | * | 6/2000 | Watson et al. | 210/615 |
| 6,099,738 A | * | 8/2000 | Wechsler et al. | 210/695 |
| 6,113,788 A | * | 9/2000 | Molof et al. | 210/605 |
| 6,221,253 B1 | * | 4/2001 | Fukase et al. | 210/695 |
| 6,896,815 B2 | * | 5/2005 | Cort | 210/695 |
| 7,001,519 B2 | | 2/2006 | Linden et al. | |
| 7,255,793 B2 | | 8/2007 | Cort | |
| 7,279,100 B2 | * | 10/2007 | Devine | 210/605 |

\* cited by examiner

*Primary Examiner*—Peter A Hruskoci
(74) *Attorney, Agent, or Firm*—Michael de Angeli

(57) ABSTRACT

A nitrification-denitrification process using magnetic seeding and magnetic separation to treat water is provided. The process includes biologically converting ammonia to nitrates with a biofilm disposed on magnetic seed. Suspended solids are removed by mixing flocculant and magnetic seeds with the water and magnetically removing floc formed floc from the water.

14 Claims, 2 Drawing Sheets

USE OF A MAGNETIC SEPARATOR TO BIOLOGICALLY CLEAN WATER

CROSS-REFERENCE TO RELATED APPLICATION

This application claims priority under 35 U.S.C. § 119(e) from the following U.S. provisional application: Application Ser. No. 60/847,384 filed on Sep. 27, 2006. That application is incorporated in its entirety by reference herein.

FIELD OF THE INVENTION

This invention is in the field of biological treatment water an in particular removing dissolved solids from water using magnetic bed media (MBM).

BACKGROUND OF THE INVENTION

Biological treatment of wastewater for removal of dissolved organics is well known and is widely practiced in both municipal and industrial plants. This aerobic biological process is generally known as the "activated sludge" process, in which micro-organisms through their growth consume organic compounds. The process necessarily includes sedimentation of the micro-organisms or "biomass" to separate it from the water and complete the process of reducing Biological Oxygen Demand (BOD) and TSS (Total Suspended Solids) in the final effluent. The sedimentation step is typically performed in a clarifier unit. Thus, the biological process is constrained by the need to produce biomass that has good settling properties. These conditions are especially difficult to maintain during intermittent periods of high organic loading and the appearance of contaminants that are toxic to the biomass.

Typically, this activated sludge treatment has a conversion ratio of organic materials to sludge of about 0.5 kg sludge/kg COD (chemical oxygen demand) (COD being a common measure of the amount of organic pollutants present), thereby resulting in the generation of a considerable amount of sludge that must be disposed of. The expense for the excess sludge treatment has been estimated at 40-60 percent of the total expense of operation of a typical wastewater treatment plant. Moreover, the conventional disposal method of landfilling may cause secondary pollution problems. Therefore, interest has been growing steadily in methods to reduce the volume and mass of the excess sludge.

Within about the last ten years, Membrane Bio-Reactor (MBR) technology has become available which combines membrane technology with the activated sludge process. In this technique, semipermeable membrane(s) having very fine pores are used to separate water from biologically-reduced pollutants in the water stream. The MBR process is not widely used because of cost and fouling problems. In these systems, ultrafiltration, microfiltration or nanofiltration membranes replace sedimentation of biomass for solids-liquid separation. The membrane can be installed in the bioreactor tank or in an adjacent tank where the mixed liquor is continuously pumped from the bioreactor tank and back producing effluent with much lower total suspended solids (TSS), typically less than 5 mg/L, compared to 20 to 50 mg/L from a clarifier.

MBRs, de-couple the biological process from the need to settle the biomass, since the membrane filters the biomass from the water. This allows operation of the biological process at conditions that would be untenable in a conventional system including: 1) high bacteria loading of 10-30 g/L, 2) extended sludge retention time, and 3) short hydraulic retention time. In a conventional clarifier system, such conditions could lead to sludge bulking and poor settleability.

The benefits of MBR include low sludge production, complete solids removal from the effluent, effluent disinfection, removal of COD, solids and nutrients in a single unit, high loading rate capability, no problems with sludge bulking, and small footprint. Disadvantages include aeration limitations, membrane fouling, and membrane cost.

Membrane costs are directly related to the membrane area needed for a given volumetric flow through the membrane, or "flux". Flux is expressed as liters/hour/$m^2$ (LMH) or gallons/day/$ft^2$ (GFD). Typical flux rates vary from approximately 10 LMH to about 50 LMH. These relatively low flux rates, which are limited largely by fouling of the membranes at higher flow rates, have slowed the growth of MBR systems for wastewater treatment.

The MBR membrane is intended to remove solid particles from a so-called "mixed liquor" which is composed of water, dissolved solids such as proteins, polysaccharides, suspended solids such as colloidal and particulate material, aggregates of bacteria or "flocs", free bacteria, protozoa, and various dissolved metabolites and cell components. In operation, the colloidal and particulate solids and dissolved organics are deposited on the surface of the membrane. The colloidal particles form a layer on the surface of the membrane called a "cake layer." Cake layer formation is especially problematic in MBRs operated in the "dead end" mode where there is no cross flow; i.e., there is no flow along the surface of the membrane that would help to keep the cake layer from forming. Depending on the porosity of the cake layer, hydraulic resistance increases and flux declines.

In addition to the cake formation on the membrane, small particles can plug the membrane pores, a fouling condition that may be irreversible. Compared to a conventional activated sludge process, floc particle size is reportedly much smaller in typical MBR units. Since MBR membrane pore size varies from about 0.04 to about 0.4 micrometers, particles smaller than this can cause pore plugging. Pore plugging increases resistance and decreases flux.

Collins et al U.S. Pat. No. 6,926,532 describes use of organic flocculating polymers to enhance the performance of MBRs in the treatment of biological waste, specifically to reduce fouling of mechanical membranes. Collins states that flocculating polymers will not inhibit biological activity if not used to excess.

In other related art, Sly et al U.S. Pat. No. 5,443,729 discloses use of magnetite as a bed material in a fluidized bed bioreactor, that is, a system wherein the water to be treated flows through a bed of granular magnetite with an attached biofilm comprising a colony of alive microorganism, pedomicrobium manganicum, to oxidize and remove manganese from water. The Sly patent shows that magnetite does not inhibit biological activity and makes a suitable MBM for biofilm attachment. The Sly patent states that "magnetite particles used in the . . . water purification process have the necessary density and surface characteristics for a suitable support particle." There is no mention of use of the magnetic properties of magnetite to prevent solids from leaving the bioreactor by using a magnetic separator.

In summary, the Sly patent shows the significant advantage of a fluidized bed bioreactor to treat water because of its low pressure drop and the high surface area of the bed material. It also shows the suitability of magnetite as a bed material for the growth of a biofilm to treat manganese. As noted, however, the Sly patent only discloses use of one microorganism, pedomicrobium manganicum, to remove one pollutant, manganese. The Sly patent also does not exploit the magnetic properties of magnetite; in particular, Sly does not suggest the use of a magnetic separator to keep the magnetite bed material retained in the fluidized bed bioreactor.

In Australian patent 534 238 to Weiss it was shown that microorganisms attach strongly to magnetite without diminishing their capacity to function microbiologically. Mac Rae and Evans, in "Factors Influencing the Adsorption of Bacteria to Magnetite in Water and Wastewater", *Water Res.* 17: 271-277 (1983), and "Removal of Bacteria from Water by Adsorption to Magnetite", *Water Res.* 18: 1377-1380 (1984) show that magnetite rapidly adsorbed 95-99% of a variety of microbial cells from aqueous suspensions.

SUMMARY OF THE INVENTION

The present invention provides a nitrification-denitrification process that utilizes magnetic seeding and magnetic separation. The process includes a step of nitrifying the water by biologically converting ammonia to nitrates in a first chamber. The nitrified water is transferred to a second chamber where the water is denitrified. The process further includes the step of mixing magnetic bed media and a flocculant with the denitrified water and forming magnetic floc in the water, the magnetic floc comprising magnetic bed media and suspended solids. The magnetic floc are collected on a magnetic collector and removed therefrom.

The present invention also entails a biological nitrification-denitrification system that includes magnetic seeding and magnetic separation. The system comprises a first nitrification chamber that has a mixer for maintaining media with biofilm thereon in suspension in the chamber. Also included is a denitrification chamber located downstream of the nitrification chamber. The denitrification chamber includes a mixer disposed in the chamber. A magnetic collector is also disposed in the denitrification chamber for collecting magnetic floc.

A biological nitrification-denitrification and clarification process is also provided by the present invention. The process utilizes magnetic seeding and magnetic separation to treat water containing ammonia. The process includes directing the water into a vessel and mixing the water with a first magnetic bed media in the vessel. The conditions in the vessel are maintained to result in a biofilm forming on the first magnetic bed media. The process includes utilizing the biofilm formed on the first magnetic bed media to nitrify the water. Further, the process provides separating the first magnetic bed media from the nitrified water and transferring the nitrified water from the vessel. The process includes mixing a second magnetic bed media with the nitrified water and forming magnetic floc where the magnetic floc comprise magnetic bed media, suspended solids, and a biofilm. The biofilm comprised in the magnetic floc is utilized to denitrify the nitrified water. The process also includes utilizing the second magnetic bed media to clarify the nitrified water and collecting the magnetic floc with a magnetic collector.

Other objects and advantages of the present invention will become apparent and obvious from a study of the following description and the accompanying drawings which are merely illustrative of such invention.

BRIEF DESCRIPTION OF THE DRAWINGS

The invention will be better understood if reference is made to the accompanying drawing, in which.

DETAILED DESCRIPTION OF THE INVENTION

Figure 1:
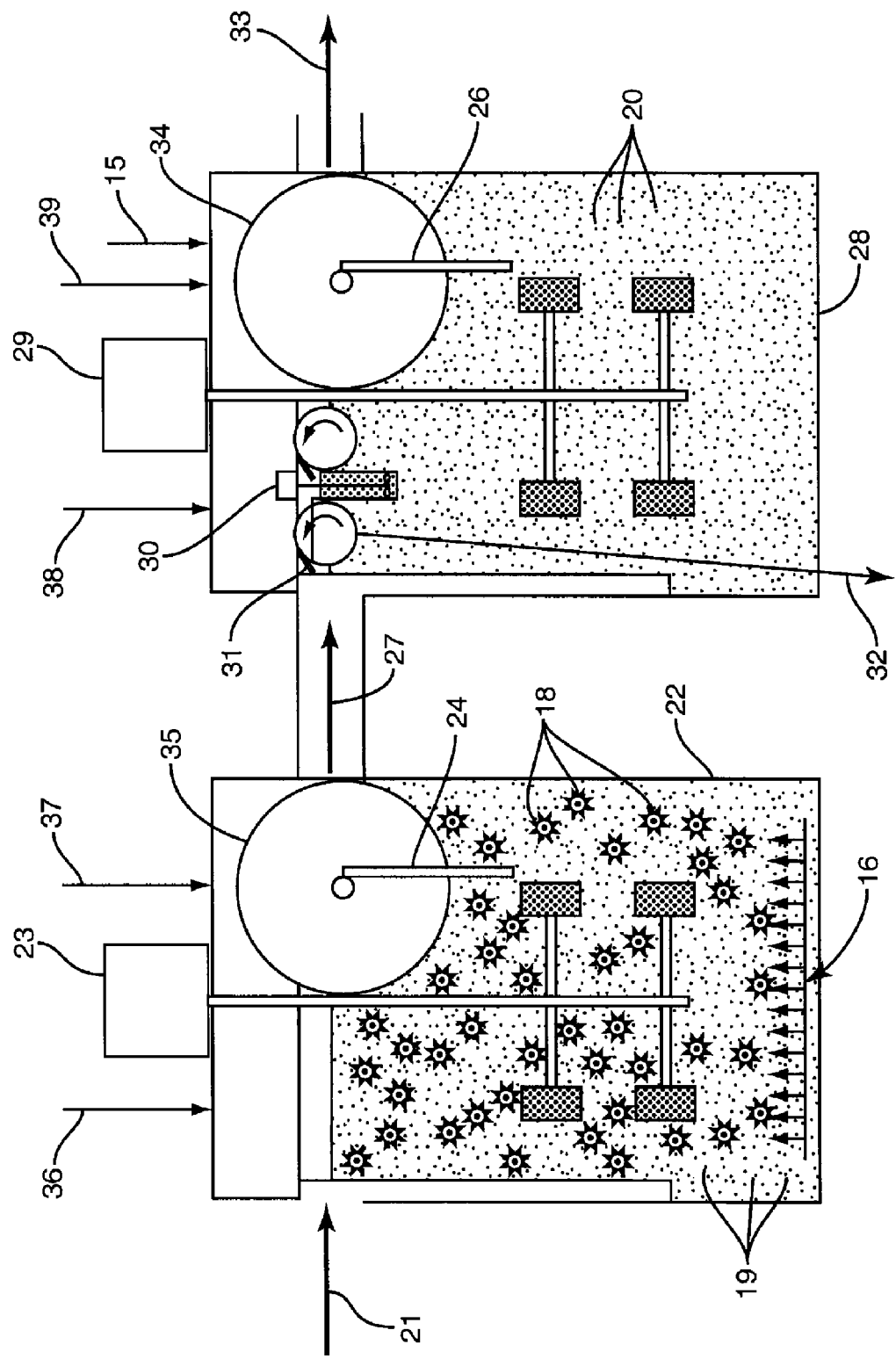
FIG. 1 shows a schematic cross-sectional view of a first embodiment of apparatus for practice of the invention.

The present invention relates to removing dissolved pollutants from water using Magnetic Bed Media (MBM), or magnetic seed such as magnetite or other ferromagnetic materials. It is applicable to industrial wastewater, municipal wastewater, potable water, combined sewer overflow, storm water, process water, cooling water and any other waters that contain dissolved organic or inorganic contaminants that can be treated biologically. The invention involves a Magnetic Separation Bio-Reactor (MSBR), which combines magnetic separation with activated sludge treatment in a process that has significant advantages over the membrane bio-reactor (MBR) technology discussed here before. The mechanical membrane in the MBR system is replaced with a "magnetic separator" for magnetic separation of the biologically-reduced pollutants from the water stream.

More specifically, the present invention provides a method for using ferromagnetic solids as a magnetic bed media (MBM) for growing biofilms that are designed to remove dissolved pollutants from water and to employ a magnetic separator to retain the biofilms in the bioreactor. Our investigation shows that magnetite is a suitable MBM to serve as a granular substrate for biofilm growth, such that the biofilm actively reduces dissolved organics. It is reasonable to believe that a wide range of biofilms can be attached to magnetite for treating a wide range of dissolved pollutants. More specifically, there is a large number of other biofilms that can be attached to magnetite in addition to pedomicrobium manganicum that was disclosed by Sly. The bacteria that make up these biofilms can be selected to target specific pollutants. The specific targeted pollutants include, but are not limited to, organics found in municipal wastewater treatment plants, sulfates found in acid mine drainage and cooling water, organics found in ground water contamination, oil and grease from industrial processes, and chlorinated solvents.

The invention also relates to use of a flocculating polymer to attach the MBM to solid organic pollutants that have undergone biological treatment by the biofilm growing on the MBM, and to other pollutant solids. The attachment of the solid pollutants to the MBM allows physical separation of the pollutants from the water stream with a magnetic separator and thereby avoids significant limitations on the use of membranes or other mechanical filters. As noted here before, the Collins patent teaches use of organic flocculating polymers to enhance the performance of MBRs in the biological treatment of waste, specifically to reduce fouling of mechanical membranes. That is, the flocculated particles are large enough that they cannot enter into the fine pores of the membrane and therefore avoid fouling. Collins asserts that flocculating polymers if not used in excess will not inhibit biological activity. This relates to the present invention because the flocculating polymer attaches magnetic particles to non-magnetic particles so they can be separated from the water stream and retained in the bioreactor by a "magnetic separator." The Collins patent does not refer to a magnetic separator as proposed according to this invention and does not make any suggestion that use of flocculating polymers would be beneficial to the operation of a magnetic separator in a MSBR according to the present invention.

Thus, while Collins shows that the use of flocculating polymers reduces fouling of mechanical membranes as found in MBRs, according to the present invention the mechanical membrane is replaced with a magnetic separator and combined with the use of MBM.

The magnetic separator used according to this invention to separate the biological sludge from the water stream is preferably made up of rotating disks that contain permanent magnets. Water containing composite magnetic particles, formed by the use of flocculating polymers that attach solid pollutants to MBM, flows between the rotating disks of the magnetic separator and is collected by the permanent magnets. The disks rotate and are continually cleaned with a scraper that scrapes off the MBM with attached solid pollutants and returns them to the treatment vessel. The design is similar to that shown in pending application Ser. Nos. 11/135,644 and 11/503,951, incorporated herein by this reference. Any magnetic separator using either permanent magnets or electromagnets designed to separate composite magnetic particles from water can be used. The dose of flocculating polymer can be controlled by monitoring biological activity as measured by TOC (total organic carbon), COD (chemical oxygen demand), or BOD (biological oxygen demand) of the effluent.

The scope of the present invention includes but is not limited to building upon the findings of Sly, who showed that magnetite can be used as a suitable bed material for the growth of biofilms that can biologically treat waste. Similarly, the present invention includes but is not limited to building on Collins, who showed that flocculating polymers do not inhibit biological activity. Based on these teachings. it appears that biological treatment taking place on the MBM can be employed to reduce dissolved pollutants in the water, and that a flocculant can then be used to bind the MBM and other solid pollutants, so that the separation of the particles from the water stream can be effected by a magnetic separator which retains the magnetic particles in the bioreactor for reuse and to limit the amount of sludge. Thus, the present invention provides a MSBR system to effectively treat wastewater containing biologically degradable pollutants.

Known membrane bio-reactor (MBR) systems have significant advantages arising from their ability to separate solids from the water stream using a mechanical barrier, thus keeping the solids in the bio-reactor for extended periods of time. However, the MBR technology is subject to many operational disadvantages and high cost. The magnetic separator bio-reactor (MSBR) of the invention has all the advantages of MBR technology and none of its disadvantages. The advantages include:

1. No membrane fouling: Since the MSBR does not have a mechanical membrane, it cannot foul. Even in applications highly susceptible to fouling, the magnetic bed media (MBM) that is employed in the MSBR has never exhibited a fouling problem, because it is not necessary to achieve complete cleaning. In any event, any fouling that does occur will not affect the magnetic properties of the MBM.
2. No pressure drop: Forcing liquid through small (micron-sized) pores in a mechanical membrane of a MBR system results in significant pressure loss. The magnetic separator of the MSBR has large openings of about one inch that do not cause any significant pressure loss. Water flows through the MSBR by gravity so no pump is needed.
3. No membrane replacement: There are no mechanical membranes to wear out in the MSBR. The magnetic separator is composed of permanent magnets that have an indefinite life. The magnets are encapsulated in plastic and do not come into contact with the wastewater.
4. Lower capital cost: The cost of a MBR capable of treating 100,000 gallons per day is calculated to be $500,000 ["Membrane Bioreactors in the Changing World Water Market", Susan Hank BCC Research, January 2006.]. The manufacturing cost of a MSBR is estimated to be much less.
5. No membrane scaling: Membranes are prone to scaling from calcium, magnesium, and silica chemicals. Magnetite, a commonly used MBM, is not known to scale but if it did, it would continue to perform its magnetic function until it could be disposed of at low cost. It is believed that the MBM will be descaled from abrasion that occurs in the cleaning process. Chemical cleaning of the MBM is also an option.
6. No membrane damage: Cleaning chemicals, water quality, or physical abrasion from suspended solids can cause damage to MBRs. Replacement cost of damaged membranes will be very high. After two years of operation of a closely-related magnetic clarifier, there has been no noticeable wear to the magnetic collection surfaces. Additionally, replacement costs would be low.
7. No membrane leakage: Membranes in a MBR have connection points where leakage can occur. This is not possible with a MSBR.
8. No membrane cleaning: Membranes have to be periodically cleaned with harsh acids and chlorine chemicals. This can cause hazardous exposure to employees and discharges of hazardous chemicals to the environment. Although chemical cleaning of the MBM cannot be definitely excluded, it is anticipated that the MSBR will not require chemical cleaning, and that cleaning of magnetic surfaces mechanically in a continuous mode will be sufficient.
9. Less energy use: Forcing water through fine pores in a membrane requires significant pumping power. A prototypical MSBR system capable of treating 100 gpm has only three small drive motors that draw less than 5 amps total.
10. Greater waste concentration: The waste concentration in the MBR is limited by membrane fouling concerns. This is evidenced by the sludge wastage of 1.5-2.0% of the influent flow claimed for the "Zenon" technology ["Membrane Bioreactors: Wastewater Treatment Applications to Achieve High Quality Effluent", Henry Mallia, Steven Till, 2001 Conference Papers, Water Industry Operators Association, Australia]. The sludge wastage in a closely-related MSBR beta system was approximately 0.5%. Removing waste from a MSBR magnetically produces a more concentrated waste than can be achieved when waste is removed from a MBR. Greater waste concentration means less waste to dewater.
11. Lower operating cost: Operating costs for a MSBR are lower because of lower energy usage, no replacement membranes required, higher concentrated waste, and no membrane cleaning chemicals. The only extra cost for a MSBR is the MBM which is consumed in the treatment process.
12. Better suited for anaerobic treatment: In anaerobic treatment, fine organic particles are formed which readily foul membranes. Also, air cannot be used to scrub the membrane clean because of the necessity to maintain anaerobic conditions. Therefore using membranes in the denitrification stage of biological treatment becomes a bigger problem because of fouling issues.
13. Continuous operation: Flow through the MBR has to be interrupted during membrane cleaning and membrane breaks. This is not a problem with the MSBR because cleaning is continuous and there are no mechanical membranes to break.
14. More flexible and robust technology: MBRs can be damaged by unexpected chemicals or contaminants in the wastewater. For example, oxidizers like chlorine can damage membranes or organics can coat and foul the membranes. The MSBR has no delicate membranes to be damaged.

15. Fewer aeration limitations: Submerged mechanical membranes require coarse air bubbles to scour the membranes clean. This limits the amount of aeration available for the biological treatment process which is more efficient with fine air bubbles.

Turning now to specific embodiments of the invention, a two-step biological process is provided. For example, as generally known in the art, effective removal of typical nutrient pollutants, e.g., ammonia, can be accomplished by successive nitrification and denitrification steps, employing aerobic and anaerobic bacteria respectively. The MSBR system according to the present invention is expected to be useful with substantially any desired biological treatment method. In one embodiment, a fixed-film media is used to enhance biological treatment. Iron is added to remove phosphates in one embodiment. One embodiment comprises using metal precipitants to remove heavy metals.

With further reference to the drawings, in a layout for a MSBR treatment system for municipal and industrial wastewater treatment applications, ammonia is reduced to nitrates via an aerobic nitrification process in a first reactor vessel or chamber 22. Contained in first reactor vessel 22 are a fixed-film media 18 and a first MBM 19. Aerobic biofilm attaches to the surfaces of fixed-film media 18 and first MBM 19 to perform the reduction of ammonia to nitrates. This approach is similar to the known Moving Bed BioReactor (MBBR) practiced by Anox Kaldnes and has similar benefits. Both first MBM 18 and fixed-film media 19 may be provided in one embodiment to ensure adequate biofilm growth while permitting magnetic separation to be performed. Fixed-film media 19 promotes the biofilm formed thereon staying attached to the media by providing a protected surface on which biofilm can grow thick and be protected from toxic shock. Typically, fixed-film media 18 is made of plastic that is nearly neutrally buoyant so it floats freely in water. Further, fixed-film media 18 has a porous surface for the attachment of biofilm, and the fixed-film media is nontoxic and noncorrosive. In one embodiment, the surface of fixed-film media 18 is textured so biofilm can attach readily, and so as to provide protected recesses in which the biofilm can grow to a thick layer that is not scoured off by abrasion with particles in the water. A common configuration for fixed-film media 18 that of a collection of small plastic cylinders.

By comparison, first MBM 19 provides a large surface area for the growth of biofilm and provides a way to increase the solids retention time (SRT) of the bacteria. However, the biofilm growing on MBM 19 is liable to loss due to abrasion. First reactor vessel 22 contains a first magnetic separator 35 that prevents particles of MBM 19 from being discharged from the vessel. The only particles passing through first magnetic separator 35 are non-magnetic biofilm particles that break away from MBM 19 or from fixed-film media 18.

The nitrates are then reduced to nitrogen gas via an anaerobic denitrification process in a second reactor vessel or chamber 28. Second reactor vessel 28 contains a second MBM 20 for affixing an anaerobic biofilm. A fixed-film media may optionally be included in second reactor vessel 28, depending on the effects of toxic shock on the bacteria. A second flocculating polymer 15 is added for attaching suspended solids including biomass to MBM 20 and forming a biofilm, thereby forming magnetic floc. Second reactor vessel 28 has a second magnetic separator 34 to keep magnetic particles from being discharged with the clean water 33. A cleaning device 30 is also included to separates the biomass and other solids, which comprise a sludge 32, from the magnetic floc. Sludge 32 is discharged for disposal or further treatment.

More specifically, water to be treated 21 typically contains dissolved inorganic or organic pollutants. Water 21 flows into the first chamber or reactor vessel 22 where a first mixer 23 solids in suspension. The solids are made up of flocculating polymer 37 (if used), organic waste solids, and first MBM 19 (preferably magnetite). Mixer 23 keeps the solids in suspension, such that a "stirred" or "fluidized bed" reactor is effectively provided. High flow rate of the water and/or aeration is used in one embodiment to keep the solids in suspension.

First magnetic separator 35 prevents magnetic particles from leaving the first reactor vessel 22. First magnetic separator 35 comprises one or more magnetic disk(s), to which particles comprising MBM 19 are attracted to prevent the MBM from being discharged with the water after treatment in vessel 22. Scrapers 24 contact the surfaces of the disk(s) and scrape MBM 19 from the disks so that the MBM is returned to the first reactor vessel 22 for re-use. As noted here before, fixed film media 18 protects the biofilm formed thereon from abrasion so that it can build up in thickness, and MBM 19 provides a large surface area for the formation of a thin aerobic biofilm layer. The biofilm layer on MBM 19 is kept thin because of abrasion between particles of the MBM, and the thin film is therefore more vulnerable to toxic shock and death. Therefore, when containing fixed film media 18 the MSBR will act like an MBBR reactor.

In one embodiment, air 16 is added for aeration to first reaction vessel 22 to establish aerobic (with oxygen) conditions conducive to nitrification of ammonia to nitrates. Chemicals may be added at 36, e.g., to remove phosphorus. A first flocculating polymer may optionally be added at 37 if needed, depending on SRT results. If it is desirable to increase the SRT, then the flocculating polymer should be used.

Water, free of particles of MBM 19 removed by first magnetic separator 35 but containing biosolids, flows through a conduit 27 into a second chamber or reactor vessel 28 that is continuously stirred with a mixer 29. Conditions in this vessel are anaerobic (without oxygen) to promote the denitrification of nitrates to nitrogen gas. Second reactor vessel 28 contains two magnetic devices.

Figure 2:
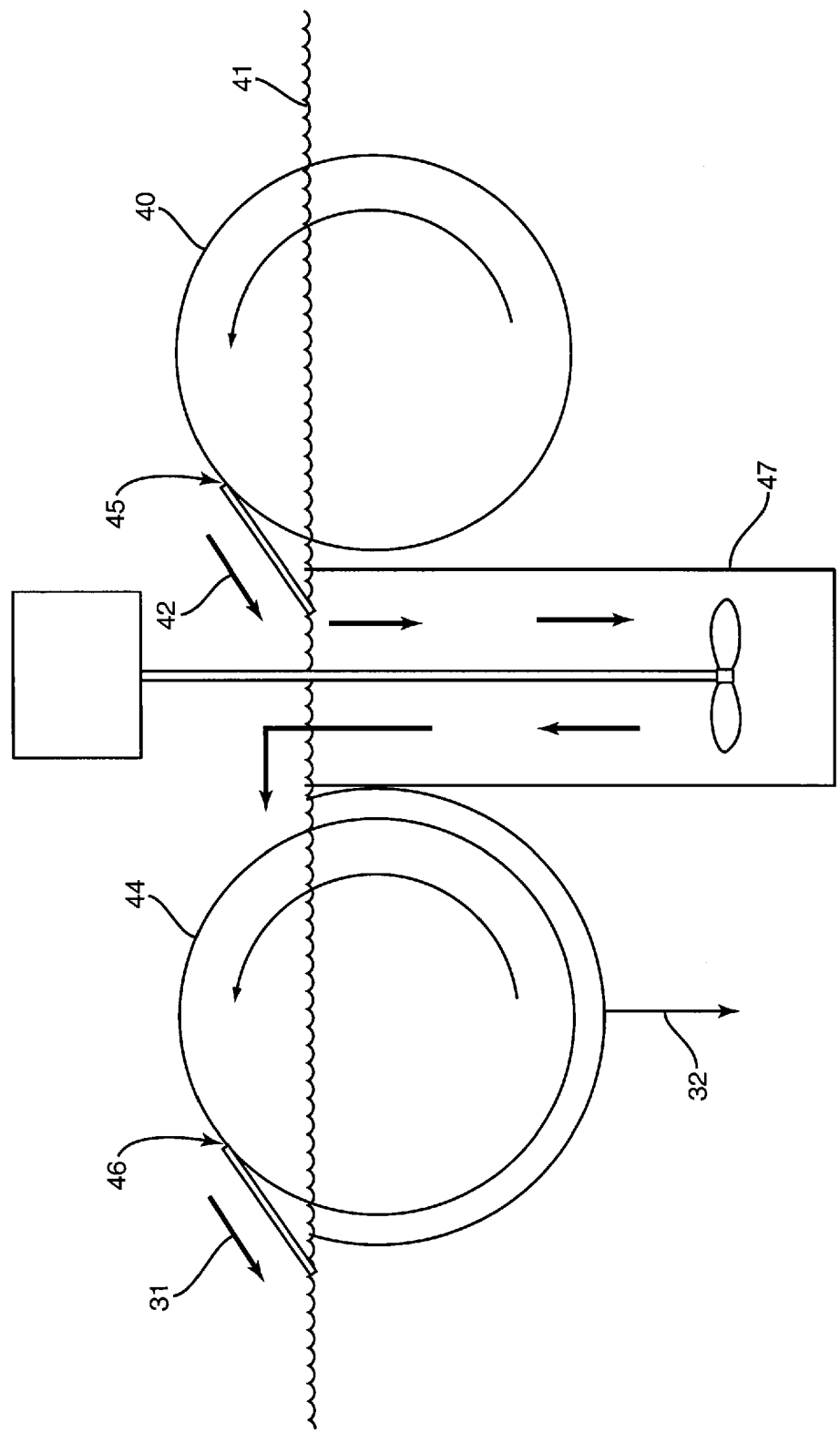
FIG. 2 shows a detail of the apparatus of FIG. 1.

Second reactor vessel 28 includes a magnetic device forming a cleaning system 30, details of which are shown in FIG. 2. Cleaning system 30 includes a first magnetic drum 40 submerged below waterline 41 so the drum will magnetically attract particles formed with second MBM 20. These particles have pollutants bound thereto by a second flocculant 15. First magnetic drum 40 rotates bringing pollutant-laden second MBM 20 to a first cleaner scraper 45 which scrapes the second MBM into a shear tank 47, the movement of the second MBM indicated by arrow 42. Inside shear tank 47 is a high-shear mixer 43 that shears pollutant-laden second MBM 20 to separate the MBM from the pollutants. A resulting sheared slurry then flows onto a second magnetic drum 44. Cleaned second MBM 20 adheres to second magnetic drum 44 and is scraped by second cleaner scraper 46 to cause the cleaned MBM to flow back into second reactor vessel (the flow indicated by 31) for re-use. The non-magnetic pollutants that do not adhere to second magnetic drum 44 are discharged at 32 for disposal as a sludge.

Second reactor vessel 28 also includes a magnetic device forming a second magnetic separator 34. Second magnetic separator 34 prevents MBM 20 from exiting the second reactor or treatment vessel 28 with the cleaned water. Scrapers 26 scrape collected MBM 20 back to the vessel 28.

Chemicals 38, e.g., iron to precipitate phosphorus, metal precipitants 39 to precipitate heavy metals, and flocculating polymers or flocculant 15 to attach second MBM 20 to nonmagnetic pollutants are added to the second treatment vessel 28. Clean water is then discharged through a pipe 33.

Thus, according to one aspect of the invention, different MBM is present in each vessel. The biofilm growing on first MBM 19 in first vessel 22. metabolizes dissolved waste only in an aerobic environment. MBM 19 is kept in this vessel because the biofilm cannot exist in anaerobic conditions. However, some nonmagnetic biofilm will break off and enter second vessel 28. By comparison, the biofilm on second MBM 20 in second vessel 28 can only exist and metabolize dissolved waste in anaerobic conditions. Therefore in summary, each vessel has its own MBM; only second vessel 28 needs a MBM cleaning system 30, to collect and remove waste solids from the MSBR system.

It is appreciated that after aerobic nitrification in first vessel 22, the water is transferred to second vessel 28 where the nitrates are biologically converted to nitrogen gas which is liberated. The biological conversion of nitrates is facilitated by biofilm grown on MBM 20. However, in addition to nitrification, removal of solids is accomplished in second vessel 28 by use of a flocculating polymer to bind suspended solids to MBM 20. The solids are sheared from MBM 20 to form a sludge which is ejected as described here before. To some extent, there are competing processes being undertaken in second vessel 28. Namely, maintaining a biofilm on MBM 20 particles to perform denitrification of the water and at the same time removing the biofilm associated with the magnetic floc in second vessel 28.

In an alternate embodiment, second vessel 28 may be utilized primarily for biological denitrification. The water denitrified in second vessel 28 would be cleaned of MBM 20 as described here before and then directed to a downstream reactor for clarification. Clarification downstream would be performed by adding a polymer flocculant along with magnetic bed media, such as magnetite, forming magnetic flocs where the suspended solids are bound with the magnetic bed media, and performing magnetic separation of the magnetic bed media from the sludge.

Reference is made to the magnetic seeding and subsequent separation techniques disclosed in application Ser. No. 11/503,951 (the '951 application) and U.S. Pat. No. 7,255,793. The disclosures of the '951 application and U.S. Pat. No. 7,255,793 are expressly incorporated herein by reference.

As used herein the term "water" includes water and all forms of wastewater.

The present invention may, of course, be carried out in other specific ways than those herein set forth without departing from the scope and the characteristics of the invention. The present embodiments are therefore to be construed in all aspects as illustrative and not restrictive and all changes coming within the meaning and equivalency range of the appended claims are intended to be embraced therein.

The invention claimed is:

1. A nitrification-denitrification method for removing pollutants from water that utilizes magnetic seeding and magnetic separation, the method comprising the steps of:
 a. in a first chamber, nitrifying the water by biologically converting ammonia to nitrates;
 b. transferring the nitrified water to a second chamber;
 c. denitrifying the water in the second chamber;
 d. mixing magnetic bed media and a flocculant with the denitrified water and forming magnetic floc in the water, wherein the magnetic floc comprises magnetic bed media and suspended solids;
 e. collecting the magnetic floc on a magnetic collector; and
 f. removing the magnetic floc from the magnetic collector, wherein the magnetic collector for collecting the magnetic floc is disposed in the second chamber and includes a rotary magnetic collector for collecting the magnetic floc; and
 g. transferring the collected magnetic floc to a shearing chamber and shearing the magnetic floc to separate the magnetic bed media from sludge; and
 h. removing the sludge and recycling the magnetic bed media to the second chamber.

2. The method of claim 1 wherein said step of nitrifying the water is performed by placing a media in the first chamber and forming biofilm on the media which is effective to nitrify the water.

3. The method of claim 2 wherein the media includes magnetic bed media and/or fixed-film media and wherein biofilm forms on either the magnetic bed media and/or the fixed-film media.

4. The method of claim 3 including the further step of aerating the first chamber.

5. The method of claim 3 wherein the media includes both magnetic bed media and fixed-film media.

6. The method of claim 1 including the further step of mixing magnetic bed media with the water in the first chamber and forming biofilm on the magnetic bed medial, while precluding the magnetic bed media with the biofilm from being directed from the first chamber to the second chamber.

7. The method of claim 6 including the further step of collecting magnetic bed media with the biofilm thereon on a magnetic collector prior to the magnetic bed media being directed into the second chamber, and removing the collected magnetic bed media and biofilm from the magnetic collector and returning the magnetic bed media and biofilm to the first chamber.

8. The method of claim 1 including the further step of aerating the first chamber and driving a mixer in the first chamber to maintain media having biofilm thereon in suspension in the first chamber; and driving a mixer in the second chamber to promote flocculation.

9. The method of claim 1 including the further steps of disposing a second magnetic collector in the second chamber, collecting additional magnetic floc on the second magnetic collector, and returning the additional magnetic floc collected on the second magnetic collector to the second chamber.

10. The method of claim 1 including the further step of operating the second chamber under generally anaerobic conditions that are sufficient to effectuate denitrification.

11. The process of claim 1 wherein the magnetic bed media comprises magnetite, zerovalant iron, or any ferromagnetic material.

12. A biological nitrification-denitrification and clarification process that utilizes magnetic seeding and magnetic separation to treat water containing ammonia, comprising:
 a. directing the water into a first vessel;
 b. mixing the water with a first magnetic bed media in the first vessel;
 c. maintaining conditions in the first vessel that result in a biofilm forming on the first magnetic bed media;
 d. utilizing the biofilm formed on the first magnetic bed media to nitrify the water;
 e. employing a first magnetic collector in the first vessel to separate the first magnetic bed media from the nitrified water, and transferring the nitrified water from the first vessel to a second vessel;
 f. mixing a second magnetic bed media with the nitrified water and a flocculating polymer in the second vessel and forming a magnetic floc where the magnetic floc comprises magnetic bed media, suspended solids, and a biofilm;
g. utilizing the biofilm to denitrify the nitrified water in the second vessel;
h. utilizing the second magnetic bed media in the second vessel to clarify the nitrified water;
i. collecting the magnetic floc with a second magnetic collector in the second vessel
j. transferring the collected magnetic floc to a shearing chamber and shearing the magnetic floc to separate the magnetic bed media from sludge; and
k. removing the sludge and recycling the magnetic bed media to the second vessel.

13. The process of claim 12 wherein the second magnetic collector is employed to separate the magnetic floc into the second magnetic bed media and a sludge.

14. The process of claim 12 wherein either the first magnetic bed media or the second magnetic bed media includes magnetite.

* * * * *